Nov. 17, 1931.    G. M. NELL    1,832,471
CHUCK FOR DRILLING MACHINES
Filed March 21, 1930
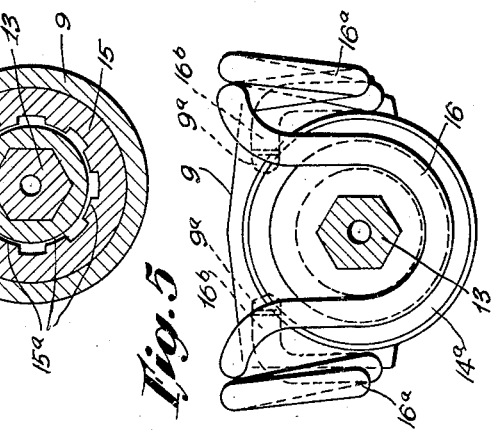
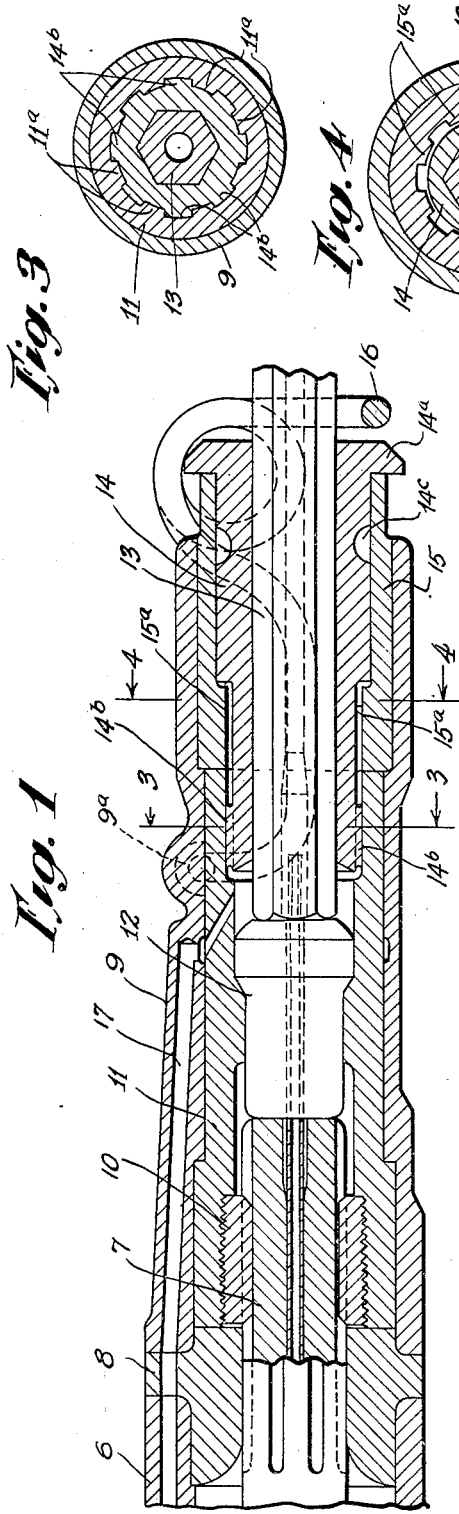
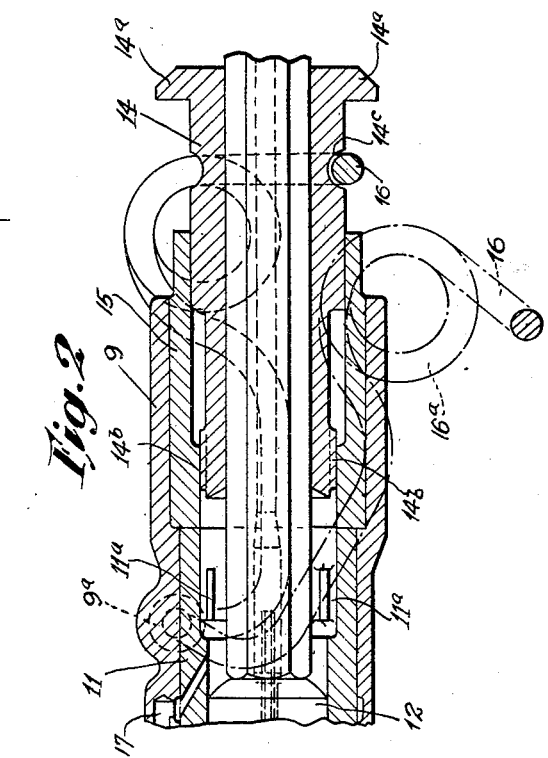
INVENTOR.
Gustave M. Nell
BY
Ira L. Nickerson
ATTORNEY.

Patented Nov. 17, 1931

1,832,471

UNITED STATES PATENT OFFICE

GUSTAVE M. NELL, OF DETROIT, MICHIGAN, ASSIGNOR TO CHICAGO PNEUMATIC TOOL COMPANY, OF NEW YORK, N. Y., A CORPORATION OF NEW JERSEY

CHUCK FOR DRILLING MACHINES

Application filed March 21, 1930. Serial No. 437,687.

This invention relates to drilling machines used in rock drilling, mining, quarrying, and the like and more particularly to chucks for holding the drill steel. It has special reference to drilling machines having rotating mechanism for the drill steel and power feeding means for advancing the machine to the work. Such machines are commonly referred to as "self rotating stopers".

One of the chief difficulties encountered in using such stopers is that of starting the drill hole. The air feed produces a positive thrust which forces the drill steel against the surface of the rock and when the percussive motor is put into operation to impart blows to the drill steel, the latter is also turned by the rotation mechanism. The effect of all of these forces is that the drill steel tends to crawl forcibly in a circular manner. This movement not only makes the starting of the hole difficult but is dangerous to the operator who may lose his balance in attempting to control and direct the machine.

One object of the invention is to provide a construction which will give the operator a greater degree of control over a self rotated stoper. Another object is to provide an improved form of chuck which will facilitate hole-starting and avoid danger to the operator. Other objects will be apparent from the detailed description which follows.

The invention involves, in a stoping machine, the provision of a simple form of drill steel chuck arranged for convenient engagement with the rotation train or for disengaging therefrom and for locking engagement with the front head or other non-rotating part of the machine. By locking the drill chuck to the machine the operator is enabled to work as with a hand rotated stoper in hole starting and after the drill steel has penetrated to a sufficient depth to form a support and to prevent crawling, he can restore the driving connection between the rotative mechanism and the chuck and continue as with a self-rotating stoper.

In order to illustrate the invention and the manner of its use, one embodiment thereof is shown in the accompanying drawings, in which:

Fig. 1 is a fragmentary longitudinal sectional view of the front end of a stoping machine showing the chuck mechanism in the normal drill steel rotating position;

Fig. 2 is a sectional view of a still smaller portion of the front end of the machine shown in Fig. 1 showing the chuck mechanism disengaged from the rotating mechanism and locked to the front head;

Fig. 3 is a transverse sectional view substantially on the line 3—3 of Fig. 1;

Fig. 4 is a similar transverse sectional view substantially on the line 4—4 of Fig. 1; and Fig. 5 is a front end elevational view of the parts shown in Fig. 1.

The illustrative embodiment of the invention discloses only the forward portion of a self-rotated stoping machine, it being understood that the machine has a percussive motor provided with suitable rotating mechanism for the drill steel and a power feed for advancing the machine to the work, such as a pneumatic feed leg. Disclosure of the power feed is omitted entirely since it forms no part of the present invention and only such portions of the percussive motor and of the rotation mechanism therefor as are essential to the understanding of the invention are illustrated. The machine has a cylinder 6 within which reciprocates an impact piston 7. The forward splined portion of piston 7 projects through and is guided in cylinder bushing 8 which is clamped between cylinder 6 and front head 9. The percussive motor may be understood to have the well known rifle bar rotation mechanism for rotating piston 7, the splined portion of which extends into front head 9 where it cooperates with a splined nut 10 securely threaded into rotative sleeve 11. The blows of piston 7 may be received by an anvil block 12 mounted in sleeve 11 and transmitted by the same to drill steel 13, the shank of which is slidably received in a chuck 14. A renewable bushing 15 securely fastened in front head 9 by a press fit, or otherwise, may be arranged to take the wear of chuck 14. To limit the projection of chuck 14 within head 9 or its bushing 15, a radial stop flange 14a is provided on chuck 14 which is shown in Fig. 1 in engagement with the bushing 15.

Chuck 14 is arranged for axial adjustment within front head 9 for clutching engagement either with rotative sleeve 11 or with front head 9. Accordingly it has at its inner end an annular series of radial ribs or splines 14b which cooperate on the one hand with complemental ribs or splines 11a on sleeve 11 when the ribbed end of the chuck is in telescoping engagement with sleeve 11 (Fig. 1), and on the other hand with complementary ribs or splines 15a on the interior of the front head bushing 15 when chuck 14 is in its outer adjusted position (Fig. 2). A yoke retainer 16, formed with coils 16a at either side for resiliency and with inturned ends 16b fitting in sockets 9a in the front head 9, is utilized releasably to maintain chuck 14 in adjusted position. When the chuck is in rotating position (Fig. 1), yoke retainer 16 is disposed outwardly of stop flange 14a. When chuck 14 is moved outwardly to lock the same to front head 9 (Fig. 2), yoke retainer 16 is received in an annular recess 14c.

The manner of use of the invention is as follows: When the operator is ready to start a hole he swings yoke retainer 16 to the open position indicated in broken lines in Fig. 2 and then adjusts chuck 14 in its outmost position with splines 14b meshing with splines 15a in front head bushing 15. Retainer 16 is then moved back to locking position whereupon it seats in annular groove 14c. Since the driving connection between rotative sleeve 11 and chuck 14 has been broken by outward movement of the latter, sleeve 11 is free to rotate without imparting rotation to the chuck. The operator can now use the stoping machine in exactly the same manner as the conventional hand rotating stoper, oscillating or rocking the entire machine to secure rotative movement of the drill steel. When the hole has been "collared" to a sufficient depth to support the drill steel and the machine, the operator closes the motive fluid throttle, swings retainer 16 to the open position to release chuck 14, and then shoves the latter into front head 9 until stop flange 14a engages bushing 15, in which position the chuck splines 14b are in mesh with splines 11a of rotative sleeve 11. Upon restoring retainer 16 to locking position and opening the throttle valve, the machine will operate as a self-rotating stoper since the chuck 14 and the drill steel 13 supported thereby will be rotated by the rotation mechanism including sleeve 11. A passage 17 may be provided in the machine for conveying motive fluid and oil into front head 9 to lubricate the moving parts therein and to keep dirt and cuttings out of the same.

From the above it will be apparent that the chuck arrangement comprises few parts of simple and rugged design which provide for convenient change from automatic rotation to hand rotation for hole starting and other purposes. It is also apparent that repairs to the front head parts can be made with great facility. In fact chuck member 14 may be renewed without disassembling any part of the machine. In addition retainer 16 provides a resilient support for the chuck against longitudinal movement in both positions of adjustment.

While the illustrative embodiment herein disclosed is a preferred form particularly adapted to machines using shankless drill steels, it is to be understood that the invention covers broadly any and all means for securing the herein disclosed objects with any form of drill steel. My copending application Serial No. 437,686, filed of even date herewith, discloses modified forms of the invention, one of which is adapted to machines using lugged steel.

I claim as my invention:

1. A drilling machine having a cylinder, a hammer piston reciprocable in said cylinder, a chuck for supporting a drill steel in position to receive the blows of said piston, rotation mechanism for said chuck including a rotative sleeve, means maintaining said chuck and sleeve in fixed axial relation to each other, and means for making and breaking the driving connection between said sleeve and said chuck.

2. A drilling machine having a cylinder, a front head thereon, a hammer piston reciprocable in said cylinder, a chuck for supporting a drill steel in position to receive the blows of said piston, a rotative sleeve in said front head, and means for establishing locking engagement of said chuck at will either with said sleeve or with said front head.

3. A drilling machine having a cylinder, a hammer piston reciprocable in said cylinder, a chuck for supporting a drill steel in position to receive the blows of said piston, said chuck being adjustable axially relative to said cylinder, and means dependent upon the adjustment of said chuck for rotating or for holding said chuck against rotation relative to said cylinder.

4. A drilling machine having a cylinder, a hammer piston reciprocable in said cylinder, a chuck for supporting a drill steel in position to receive the blows of said piston, said chuck being adjustable axially relative to said cylinder, means for releasably maintaining said chuck in adjusted position, and means dependent upon the adjustment of said chuck for rotating or for holding said chuck against rotation relative to said cylinder.

5. A drilling machine having a cylinder, a hammer piston reciprocable therein, a front head on said cylinder, a rotary sleeve in said front head, a chuck for supporting a drill steel in position to receive the blows of said piston, and means for clutching said chuck at will either to said sleeve or to said front head.

6. A drilling machine having a cylinder, a hammer piston reciprocable therein, a front head on said cylinder, a rotary sleeve in said front head, a chuck slidably mounted in said front head in line with said sleeve for supporting a drill steel in position to receive the blows of said piston, and means dependent upon the position of said chuck within said front head for clutching said chuck to the latter or to said sleeve.

7. A drilling machine having a cylinder, a hammer piston reciprocable therein, a front head on said cylinder, a rotary sleeve in said front head, a chuck slidably mounted in said front head in line with said sleeve for supporting a drill steel in position to receive the blows of said piston, means for maintaining said chuck in two positions of adjustment within said front head, and means dependent upon the adjustment of said chuck for clutching the latter either to said sleeve or to said front head.

8. A drilling machine having a cylinder, a hammer piston reciprocable therein, a front head on said cylinder, a rotary sleeve in said front head, a chuck slidably mounted in said front head in line with said sleeve for supporting a drill steel in position to receive the blows of said piston, means movably mounted on said front head and engageable with said chuck at axially spaced points for resiliently maintaining said chuck in adjusted position, and means dependent upon the adjustment of said chuck for clutching the latter either to said sleeve or to said front head.

9. A drilling machine having a cylinder, a hammer piston reciprocable therein, a front head on said cylinder, a rotary sleeve in said front head, a chuck slidably mounted in said front head in line with said sleeve for supporting a drill steel in position to receive the blows of said piston, a yoke retainer on said front head for maintaining said chuck in adjusted position, and means rendered operative by the position of said chuck for clutching the latter to said sleeve or to said front head.

10. A drilling machine having a cylinder, a hammer piston reciprocable therein, a front head on said cylinder, a rotary sleeve in said front head, a chuck slidably mounted in said front head and having a portion projecting therefrom, a retainer on said front head engaging the projecting portion of said chuck to maintain the latter in adjusted position, and means dependent upon the position of said chuck for clutching the latter to said sleeve or to said front head.

11. A drilling machine having a cylinder, a hammer piston reciprocable therein, a front head on said cylinder, a chuck movably mounted in said front head for supporting a drill steel in position to receive the blows of said piston, rotation mechanism for said chuck, and means for disconnecting said chuck from said rotation mechanism and for locking the same against rotation to said front head.

12. A drilling machine having a cylinder, a hammer piston reciprocable therein, a front head on said cylinder, a chuck movably mounted in said front head for supporting a drill steel in position to receive the blows of said piston, rotation mechanism for said chuck, and means for disconnecting said chuck from said rotation mechanism and for locking the same against rotation to said front head including clutch members on the exterior of said chuck.

13. A drilling machine having a cylinder, a hammer piston reciprocable therein, a front head on said cylinder, a chuck movably mounted in said front head for supporting a drill steel in position to receive the blows of said piston, rotation mechanism for said chuck including a rotary sleeve in said front head, said chuck being arranged for telescoping engagement with said sleeve, clutch teeth on said sleeve and on said front head, and cooperating clutch teeth on said chuck for selectively engaging said first mentioned clutch teeth.

14. A drilling machine having a cylinder, a hammer piston reciprocable therein, a front head on said cylinder, a chuck movably mounted in said front head for supporting a drill steel in position to receive the blows of said piston, rotation mechanism for said chuck including a rotary sleeve in said front head, said chuck being arranged for telescoping engagement with said sleeve, clutch teeth on said sleeve and on said front head, cooperating clutch teeth on said chuck for selectively engaging said first mentioned clutch teeth dependent upon the position of adjustment of said chuck in said front head, and means for releasably retaining said chuck in adjusted position.

15. A drilling machine having a cylinder, a hammer piston reciprocable therein, a front head on said cylinder, a chuck movably mounted in said front head for supporting a drill steel in position to receive the blows of said piston, rotation mechanism for said chuck including a rotary sleeve in said front head, said chuck being arranged for telescoping engagement with said sleeve, axial splines or ribs on the interior of said sleeve and of said front head forming clutch teeth, and cooperating axial splines or ribs on the exterior of said chuck selectively engaging said first named ribs by axial adjustment of said chuck within said front head.

16. A drilling machine having a cylinder, a hammer piston reciprocable therein, a front head on said cylinder, a chuck movably mounted in said front head and having a portion projecting therebeyond for supporting a drill steel in position to receive the blows of said piston, rotation mechanism for said chuck including a rotary sleeve in said front head, said chuck being arranged for telescoping engagement with said sleeve, axial splines or ribs on the interior of said sleeve and of said front head forming clutch teeth, cooperating axial splines or ribs on the exterior of said chuck selectively engaging said first named splines by axial adjustment of said chuck in said front head, and a yoke retainer on said front head for engaging the projecting portion of said chuck to maintain the same in adjusted position.

Signed by me at Detroit, in the county of Wayne and State of Michigan, this 11th day of March, 1930.

GUSTAVE M. NELL.